UNITED STATES PATENT OFFICE.

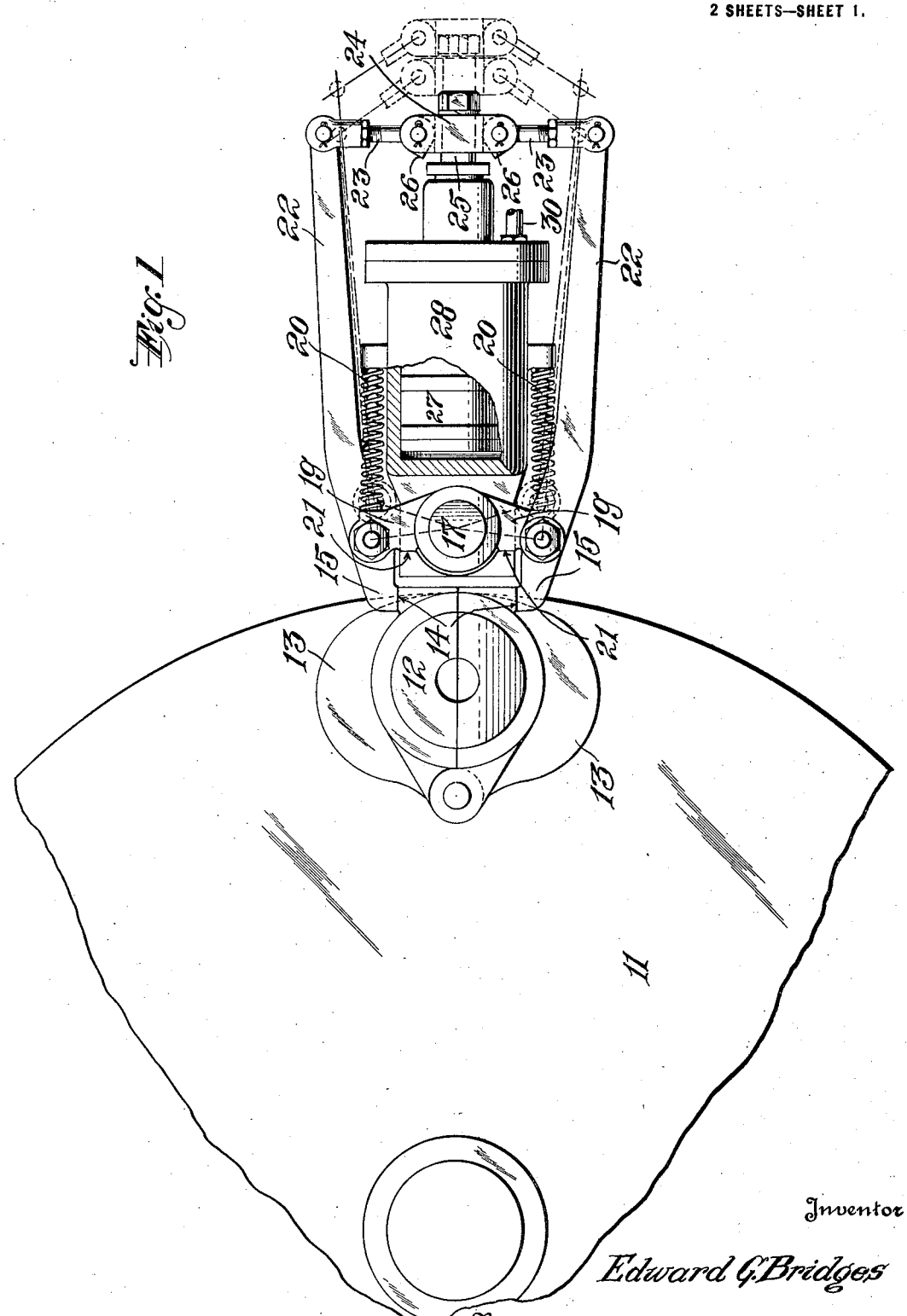

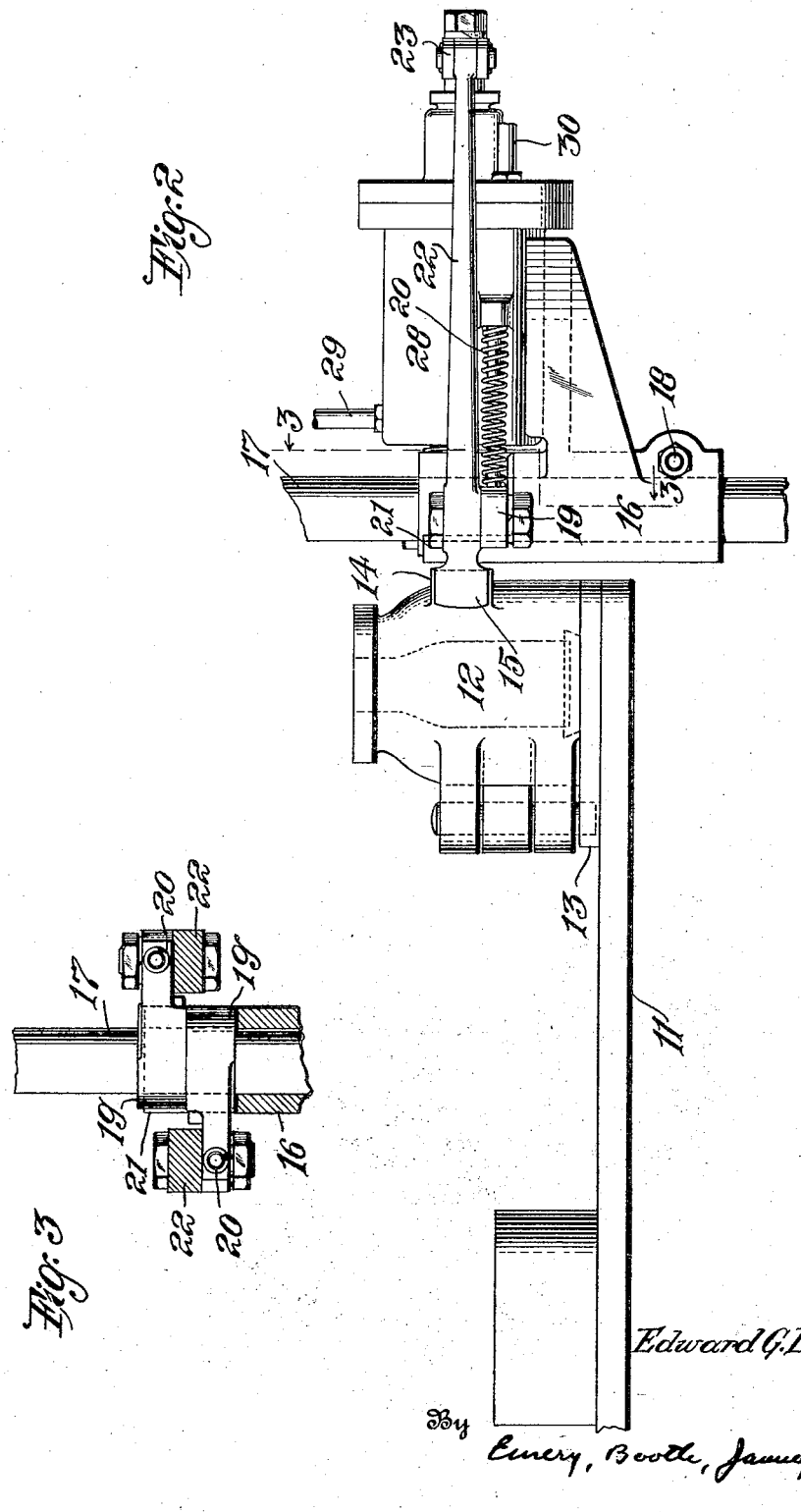

EDWARD G. BRIDGES, OF ANDERSON, INDIANA, ASSIGNOR TO LYNCH GLASS MACHINERY COMPANY, OF ANDERSON, INDIANA, A CORPORATION OF INDIANA.

MOLD-CLAMP FOR GLASS-FORMING MACHINES.

1,398,670.   Specification of Letters Patent.   Patented Nov. 29, 1921.

Application filed March 24, 1920. Serial No. 368,208.

*To all whom it may concern:*

Be it known that I, EDWARD G. BRIDGES, a citizen of the United States, and a resident of Anderson, in the county of Madison and State of Indiana, have invented an Improvement in Mold-Clamps for Glass-Forming Machines, of which the following description, in connection with the accompanying drawings, is a specification, like characters on the drawings representing like parts.

This invention relates to glass molding machines wherein the molds are mounted on a movable carrier and are successively brought into the several operating positions where they have to be held shut by suitable clamping devices.

The objects of the invention are to provide automatic means for securely clamping the molds shut in proper position during the successive operating periods, and to unclamp the molds and permit them to be moved along to their next operating position at the end of the operating periods.

Further objects are to provide for accommodating molds of different heights and sizes to suit the different sizes of bottles or other articles being formed, and for adjusting the clamping jaws to center the molds accurately in operating position; and to dispose of the clamping jaws and operating devices in a compact unit not liable to derangement and easily accessible for adjustment.

In order that the construction and operation of the invention may be understood it is shown in the accompanying drawings and hereinafter described as applied to a rotary table type of glass molding machine; but it is not restricted to such a machine. What the invention consists of is defined in the appended claims.

In the drawings, Figure 1 is a plan view of a portion of a glass molding machine showing a mold and clamping mechanism in clamping position, the center lines of the clamping jaws and links being shown in dotted lines in open position and in dot and dash lines in retracted position;

Fig. 2 is a side elevation of the mold and clamping mechanism in the clamping position; and Fig. 3 is a vertical section through the clamping members and supporting bracket on the line 3—3 in Fig. 2, looking in the direction of the arrows.

The machine illustrated in the drawings has a rotating table or carrier 11 upon which the molds 12 are supported on the bottom plates 13 at regularly spaced intervals around the edge of the table. Each mold is made in halves, which are pivoted to the bottom plate to spread open for removing the formed glass article. The molds have lugs 14 on their outer edges, and at each molding position a clamping device is mounted adjacent to the table, the jaws 15 of which engage the lugs 14 and hold the molds closed during the molding operation.

The clamping device is supported on a bracket 16 which is slidable up and down on a post 17 and may be clamped at the proper elevation to clamp molds of any desired height by means of a bolt 18. The clamping jaws are pivotally and movably mounted on the ends of arms 19 which are pivoted on the post 17 and rest on the bracket 16. The arms swing toward and away from the mold with the jaws, and normally are held forward by the springs 20 against the stop lugs 21 on the top of the bracket. The faces of the lugs 14 and jaws 15 are parallel and are of sufficient size so that slight variations in the position of the jaws relative to the lugs in the line of the forward and back movement of the jaws have no effect on the clamping action of the jaws to hold the mold halves solidly together in proper operating position.

The jaws have long operating arms 22 connected at their extremities by means of links 23 to a cross head 24 carried on the extremity of the operating rod 25. The outer ends of the links 23 are adjustable in length, and the inner ends have shoulders 26 which work in slots in the ends of the cross head and upon movement of the operating rod permit the links to swing sufficiently to unclamp the jaws from the lugs on the molds, but prevent further swinging movement of the links. The operating rod is connected to a piston 27 in a cylinder 28 supported on the bracket 16 between the operating arm 22.

The piston is moved at the proper times to operate the clamping device by air admitted to one end or the other end of the cylinder through the pipes 29 and 30. The flow of air to the cylinder is controlled by a suitable valve operated in synchronism with the table rotating device of the machine. The valve and table operating mechanism are not shown as they may be of any known construction suitable for the purpose.

The operation of the device is as follows: Starting with the apparatus in clamping position as shown in full lines in Fig. 1, air is admitted to the inner end of the cylinder through the pipe 29 and the piston and operating rod are forced out carrying the cross head and inner ends of the links until the outer ends of the latter and clamping arms 21 have swung inward as for as the shoulders 26 will let them, thereby releasing the clamping jaws from the lugs of the molds (see intermediate position shown in dotted lines in Fig. 1), after which further movement of the piston and operating rod will carry the links and clamping arms and jaws bodily away from the cylinder and mold until the jaws are clear of the lugs 14 (see extreme position shown in dot and dash lines in Fig. 1) and the mold carrier can rotate to carry the mold away and bring another into position in its place.

After the next mold has been brought into operating position by rotation of the carrier, air is admitted to the outer end of the cylinder through the pipe 30 and the piston is moved back toward the inner end, carrying the operating rod and cross head with it. The springs 20 will carry the clamping jaws toward the mold and the links will move with the cross-head until the arms 19 strike against the stop lugs 21, after which further movement of the cross-head will swing the links outward to clamp the jaws upon the lugs 14.

Both the position of the clamping jaws relative to the radial position of the mold and the distance between the jaws in clamping position may be adjusted by adjusting the length of the links 23 without interfering with the most effective functioning of the links and arms to secure the maximum clamping force whatever the air pressure. Moreover, loss of air pressure in the outer end of the cylinder after the jaws are clamped on the lugs will not release the jaws if the length of the links is properly adjusted so that they are in line with each other in the clamping position.

I claim the following as my invention:

1. In a glass-molding machine having a series of molds comprising separable parts mounted on a carrier, a support adjacent to the path of movement of said molds, a clamping device mounted on said support, said clamping device comprising a pair of jaws each of which is pivoted on a swinging arm to swing toward and from said molds to engage said mold parts, respectively, and means for operating the jaws in engaging position to shut and open and for intermittently swinging the arms and jaws into and from engaging position with successive molds as they move into and out of clamping position.

2. In a glass-molding machine having a series of molds comprising separable parts mounted on a carrier, a support adjacent to the path of movement of said molds and adjustable relatively thereto, a clamping device mounted on said support, said clamping device comprising a pair of jaws each of which is pivoted on a swinging arm for movement toward and from said molds and adapted to engage said mold parts, respectively, and means for operating the jaws and for swinging the arms and jaws toward and from the mold position whereby the molds may be shifted successively into and out of clamping position.

3. In a glass-molding machine having a series of molds comprising separable parts mounted on a carrier, a support adjacent to the path of movement of said molds, a clamping device mounted on said support, said clamping device comprising a pair of independently adjustable jaws adapted to engage said mold parts, respectively, means for adjusting the jaws relatively to each other and to the mold position, and means for operating the jaws and for moving them toward and from the mold position whereby the molds may be shifted successively into and out of clamping position.

4. In a glass-molding machine having a series of molds mounted on a carrier, each of said molds comprising hinged sections pivoted together on one side and provided with clamp engaging portions on the opposite side, a support adjacent to the path of movement of said molds, a clamping device mounted on said support, said clamping device comprising a pair of jaws adapted to engage said clamp engaging portions, means for adjusting the jaws relatively to each other and each independently of the other, and means for operating the jaws and for moving them toward and from the mold position whereby the molds may be shifted successively into and out of clamping position.

5. In a glass-molding machine, the combination of a mold carrier and molds thereon composed of hinged sections, means arranged alongside the path of movement of the molds for engaging the mold sections and clamping them together, said clamping means comprising a pair of levers pivoted near their mold engaging ends to swinging arms, an operating device located between the opposite ends of said levers, and links connecting said operating device and the ends of said levers whereby movement of said operating device swings said links and levers toward and from the mold sections.

6. In a glass-molding machine, the combination of a mold carrier and molds thereon composed of hinged sections, means arranged alongside the path of movement of the molds for engaging the mold sections and clamping them together, said clamping means comprising a pair of levers pivoted near their mold engaging ends to swinging arms, a stop for limiting the movement of said arms toward the mold sections, an operating device located between the opposite ends of said levers, and links connecting said operating device and the ends of said levers whereby movement of said operating device swings said links and levers toward and from the stop and engages and disengages the clamping means and mold sections.

7. In a glass-molding machine, the combination of a mold carrier and molds thereon composed of hinged sections, means arranged alongside the path of movement of the molds for engaging the mold sections and clamping them together, said clamping means comprising a pair of levers pivoted near their mold engaging ends to swinging arms, an operating device located between the opposite ends of said levers, and links connecting said operating device and the ends of said levers, said links having shoulders limiting the swinging movement of said links, whereby movement of said operating device swings said links to open and close said clamping levers and to move said arms and levers toward and from the mold sections.

In testimony whereof, I have signed my name to this specification.

EDWARD G. BRIDGES.